United States Patent
Aga et al.

(10) Patent No.: US 12,265,735 B2
(45) Date of Patent: Apr. 1, 2025

(54) APPROACH FOR PROCESSING NEAR-MEMORY PROCESSING COMMANDS USING NEAR-MEMORY REGISTER DEFINITION DATA

(71) Applicant: Advanced Micro Devices, Inc., Santa Clara, CA (US)

(72) Inventors: Shaizeen Aga, Santa Clara, CA (US); Nuwan Jayasena, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/845,263

(22) Filed: Jun. 21, 2022

(65) Prior Publication Data

US 2023/0409238 A1 Dec. 21, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 5,613,132 A * | 3/1997 | Clift | ...... | G06F 9/3858 712/217 |
| 5,881,280 A * | 3/1999 | Gupta | ...... | G06F 9/3842 712/E9.05 |
| 5,923,883 A * | 7/1999 | Tanaka | ...... | G06F 8/443 712/220 |
| 10,691,435 B1 * | 6/2020 | Koryakin | ...... | G06F 9/30101 |
| 2014/0281321 A1 * | 9/2014 | Carreno | ...... | G06F 21/57 711/164 |
| 2015/0095623 A1 * | 4/2015 | Ermolaev | ...... | G06F 9/30043 712/222 |
| 2015/0261590 A1 * | 9/2015 | Sperber | ...... | G06F 11/073 714/42 |
| 2022/0365726 A1 * | 11/2022 | Pathiyakkara Thombra | ...... | G06F 13/1657 |

* cited by examiner

*Primary Examiner* — Charles J Choi
(74) *Attorney, Agent, or Firm* — Hickman Becker Bingham Ledesma LLP

(57) ABSTRACT

An approach is provided for processing near-memory processing commands, e.g., PIM commands, using PIM register definition data that defines multiple combinations of source and/or destination registers to be used to process PIM commands. A particular combination of source and/or destination registers to be used to process a PIM command is specified by the PIM command or determined by a near-memory processing element processing the PIM command. According to another implementation, the PIM register definition data specifies an initial combination of source and/or destination registers and one or more update functions for each PIM command. A near-memory processing element processes a PIM command using the initial combination of source and/or destination registers and uses the one or more update functions to update the combination of source and/or destination registers to be used the next time the PIM command is processed.

18 Claims, 6 Drawing Sheets

400

| Command | Combination 1 | Combination 2 |
|---|---|---|
| pim-load | X, reg0 | X, reg2 |
| pim-multiply | reg0, reg0, reg1 | reg2, reg2, reg3 |
| pim-add | reg0, reg1, reg0 | reg2, reg3, reg2 |
| pim-store | reg0, X | reg2, X |

FIG. 3 pim-load (column-address0, reg0)
pim-load (column-address1, reg2)
pim-multiply (reg0, reg0, reg1)
pim-multiply (reg2, reg2, reg3)

pim-add (reg0, reg1, reg0)
pim-add (reg2, reg3, reg2)
pim-store (reg0, column-address0)
pim-store (reg2, column-address1)

| Command | Combination 1 | Combination 2 |
|---|---|---|
| pim-load | X, reg0 | X, reg2 |
| pim-multiply | reg0, reg0, reg1 | reg2, reg2, reg3 |
| pim-add | reg0, reg1, reg0 | reg2, reg3, reg2 |
| pim-store | reg0, X | reg2, X |

| Command | Source 1 | Source 1 Update Function | Source 2 | Source 2 Update Function | Destination | Destination Update Function |
|---|---|---|---|---|---|---|
| pim-load | X | n/a | n/a | n/a | reg0 | Add 2 |
| pim-multiply | reg0 | Add 2 | reg0 | Add 2 | reg1 | Add 2 |
| pim-add | reg0 | Add 2 | reg1 | Add 2 | reg0 | Add 2 |
| pim-store | reg0 | Add 2 | n/a | n/a | X | n/a |

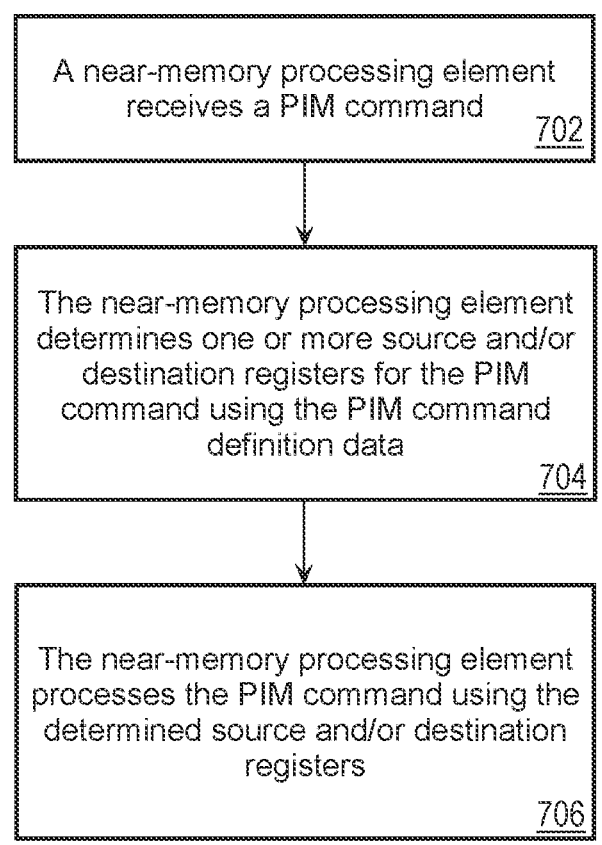

APPROACH FOR PROCESSING NEAR-MEMORY PROCESSING COMMANDS USING NEAR-MEMORY REGISTER DEFINITION DATA

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

As computing throughput scales faster than memory bandwidth, various techniques have been developed to keep the growing computing capacity fed with data. Processing In Memory (PIM) incorporates processing capability within memory modules so that tasks can be processed directly within the memory modules. In the context of Dynamic Random-Access Memory (DRAM), an example PIM configuration includes vector compute elements and local registers. The vector compute elements and the local registers allow a memory module to perform some computations locally, such as arithmetic computations. This allows a memory controller to trigger local computations at multiple memory modules in parallel without requiring data movement across the memory module interface, which can greatly improve performance, particularly for data-intensive workloads. Examples of data-intensive workloads include machine learning, genomics, and graph analytics.

One of the challenges with PIM is that in situations where the information required for a complete PIM command requires more bits that the command bus width, multiple command cycles are needed for each PIM command to convey the required information. For example, suppose that N number of bits is needed to specify a command, a source register, and a destination register. If the command bus width is only K number of bits and N is greater than K, then multiple command cycles are needed for each PIM command to convey the N number of bits of command information. Requiring multiple command cycles for each PIM command increases command bus congestion, which reduces throughput and increase power consumption.

One solution for addressing this problem is to trigger complex PIM operations with a single command, where each PIM command issued from a host to memory invokes many PIM commands inside the memory module. One disadvantage to this solution is that it leads to non-deterministic timing of memory commands, which increases scheduling complexity at the memory controller. Another disadvantage is that the use of complex PIM commands prevents fine-grained interleaving of PIM and non-PIM commands, which can adversely affect the performance of co-scheduled non-PIM computations.

Another solution for addressing this problem uses processor instructions that can repeat a single instruction with incrementing operand addresses until a specified condition is satisfied, such as a count threshold, a zero/non-zero result, etc. One disadvantage to this solution is that it is only applicable to memory-to-memory string operations where a memory address is incremented, and is not applicable to incrementing source and destination registers. Yet another similar solution is vector computing architectures that increment register and operand IDs while repeating an operation, but this solution is only applicable to operations performed on entire vectors of a specified length at a host, and does not allow for fine-grained interleaving of instructions, especially in PIM. There is, therefore, a need for an approach for implementing PIM that addresses the foregoing limitations.

BRIEF DESCRIPTION OF THE DRAWINGS

Implementations are depicted by way of example, and not by way of limitation, in the figures of the accompanying drawings and in which like reference numerals refer to similar elements.

FIG. 3 depicts two example PIM code segments that include similar computations with varied register operands.

FIG. 4A depicts a table of PIM register definition data that specifies two pre-defined combinations of source/and or destination registers for each of the four PIM commands.

FIG. 4B depicts a table of PIM register definition data that specifies, for each PIM command, a combination of source and/or destination registers and corresponding update functions.

FIG. 7 is a flow diagram that depicts an approach for processing PIM commands using PIM register definition data that specifies update functions for dynamically determining source and/or destination registers for PIM commands.

DETAILED DESCRIPTION

Figure 1:
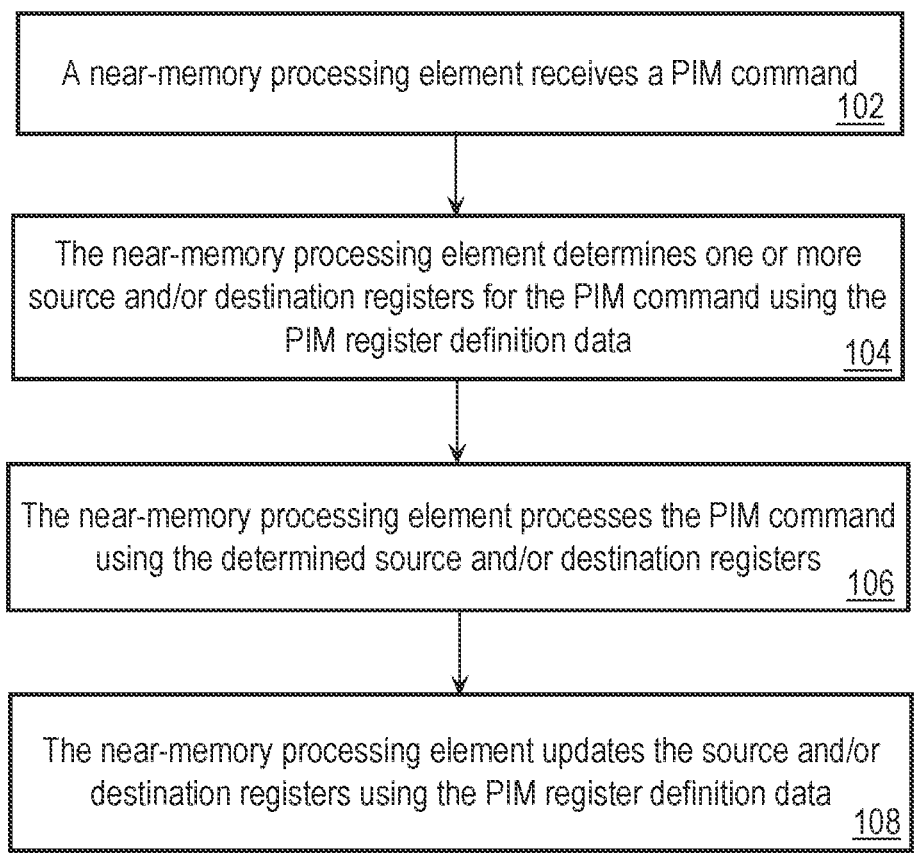
FIG. 1 is a flow diagram that depicts an approach for processing PIM commands using PIM register definition data.

In the following description, for the purposes of explanation, numerous specific details are set forth in order to provide a thorough understanding of the implementations. It will be apparent, however, to one skilled in the art that the implementations may be practiced without these specific details. In other instances, well-known structures and devices are shown in block diagram form in order to avoid unnecessarily obscuring the implementations.

I. Overview
  II. Architecture
  III. Processing PIM Commands Using PIM Command Definition Data
    A. Introduction
    B. Pre-Defined Combinations of PIM Registers
    C. Dynamically-Determined Combinations of PIM Registers IV. Alternatives, Extensions and Software Support

I. Overview

An approach is provided for processing near-memory processing commands, e.g., PIM commands, using PIM register definition data. According to an implementation, PIM register definition data defines multiple combinations of source and/or destination registers to be used to process PIM commands. A particular combination of source and/or destination registers to be used to process a PIM command is specified by the PIM command or determined by a near-memory processing element processing the PIM command. According to another implementation, the PIM register definition data specifies initial source and/or destination registers and one or more update functions for each PIM command. A near-memory processing element processes a PIM command using the initial source and/or destination registers and uses the one or more update functions to update the source and/or destination registers to be used the next time the PIM command is processed, e.g., by changing a source register value, a destination register value, or both the source register value and the destination register value. Applying an update function may, for example, increment or decrement a source or destination register value by a specified amount.

The approach harnesses commonality in source and/or destination registers among PIM commands to reduce the amount of data in PIM commands, e.g., bits, which need to be allocated to specify source and destination registers in PIM commands, and makes those bits available for other purposes. The approach eliminates the need for multiple command cycles to provide all of the information needed for a PIM command. This reduces command bus traffic and power consumption, while maintaining fine-grained control. The approach is particularly beneficial for code segments that repeat similar computations with varied operands that specify different source and/or destination registers.

Implementations are described herein in the context of PIM and PIM commands for purposes of explanation, but implementations are applicable to any type of near-memory processing technology. Implementations are also described herein in the context of near-memory registers for purposes of explanation, but implementations are applicable to any type of near-memory local storage, such as buffers, etc. As used herein, the term "near-memory" refers to anywhere within or near a memory module, such as at caches memory controllers, etc.

FIG. 1 is a flow diagram 100 that depicts an approach for processing PIM commands using PIM register definition data. In step 102, a near-memory processing element receives a PIM command. For example, a PIM execution unit in or near a DRAM memory module receives a PIM command from a memory controller. The PIM command specifies a particular PIM command and variable information, such as a memory location, but does not specify one or more source and/or destination registers that would ordinarily be specified by a PIM command.

In step 104, the near-memory processing element determines one or more source and/or destination registers for the PIM command using PIM register definition data. In the implementation where the PIM register definition data defines multiple combinations of source and/or destination registers, the near-memory processing element uses a particular combination of source and/or destination registers as specified by the PIM command or determined by the near-memory processing element, as described in more detail hereinafter. In the implementation where the PIM register definition data specifies how to dynamically determine PIM registers, the near-memory processing element determines the initial combination of source and/or destination registers to be used to process the PIM command.

In step 106, the near-memory processing element processes the PIM command using the source and/or destination registers determined using the PIM register definition data.

In step 108, in the implementation where the PIM register definition data specifies how to dynamically determine the source and/or destination registers, the near-memory processing element updates the source and/or destination registers for the next invocation of the PIM command using the PIM register definition data, as described in more detail hereinafter.

II. Architecture

Figure 2A:
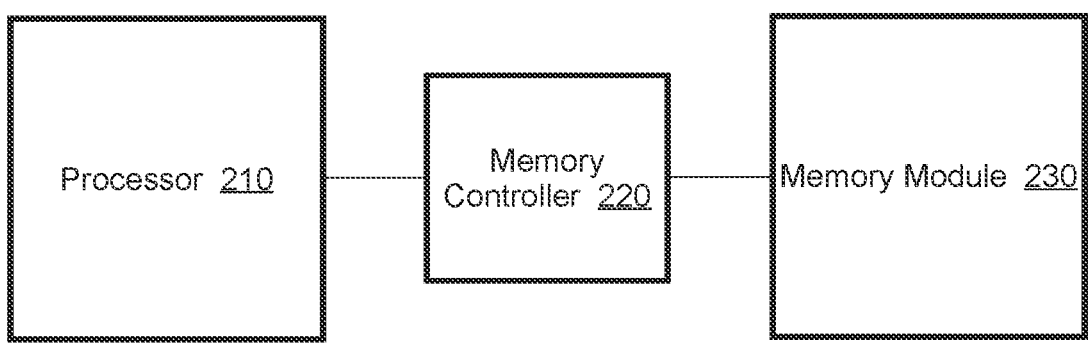
FIG. 2A is a block diagram that depicts an example computing architecture upon which the approach for processing PIM commands using PIM register definition data is implemented.

FIG. 2A is a block diagram that depicts an example computing architecture 200 upon which the approach for processing PIM commands using PIM register definition data is implemented. In this example, the computing architecture 200 includes a processor 210, a memory controller 220, and a memory module 230. The computing architecture 200 includes fewer, additional, and/or different elements depending upon a particular implementation. In addition, implementations are applicable to computing architecture 200 with any number of processors, memory controllers and memory modules.

The processor 210 is any type of processor, such as a Central Processing Unit (CPU), a Graphics Processing Unit (GPU), an Application-Specific Integrated Circuit (ASIC), a Field-Programmable Logic Array (FPGA), an accelerator, a Digital Signal Processor (DSP), etc. The processor 210 includes the capability, e.g., via memory command logic, to issue near-memory processing commands, such as PIM commands. The memory module 230 is any type of memory module, such as a Dynamic Random Access Memory (DRAM) module, a Static Random Access Memory (SRAM) module, etc. According to an implementation the memory module 230 is a PIM-enabled memory module.

The memory controller 220 manages the flow of data between the processor 210 and the memory module 230 and is implemented as a stand-alone element or in the processor 210, for example on a separate die from the processor 210, on the same die but separate from the processor, or integrated into the processor circuitry as an integrated memory controller. The memory controller 220 is depicted in the figures and described herein as a separate element for explanation purposes.

Figure 2B:
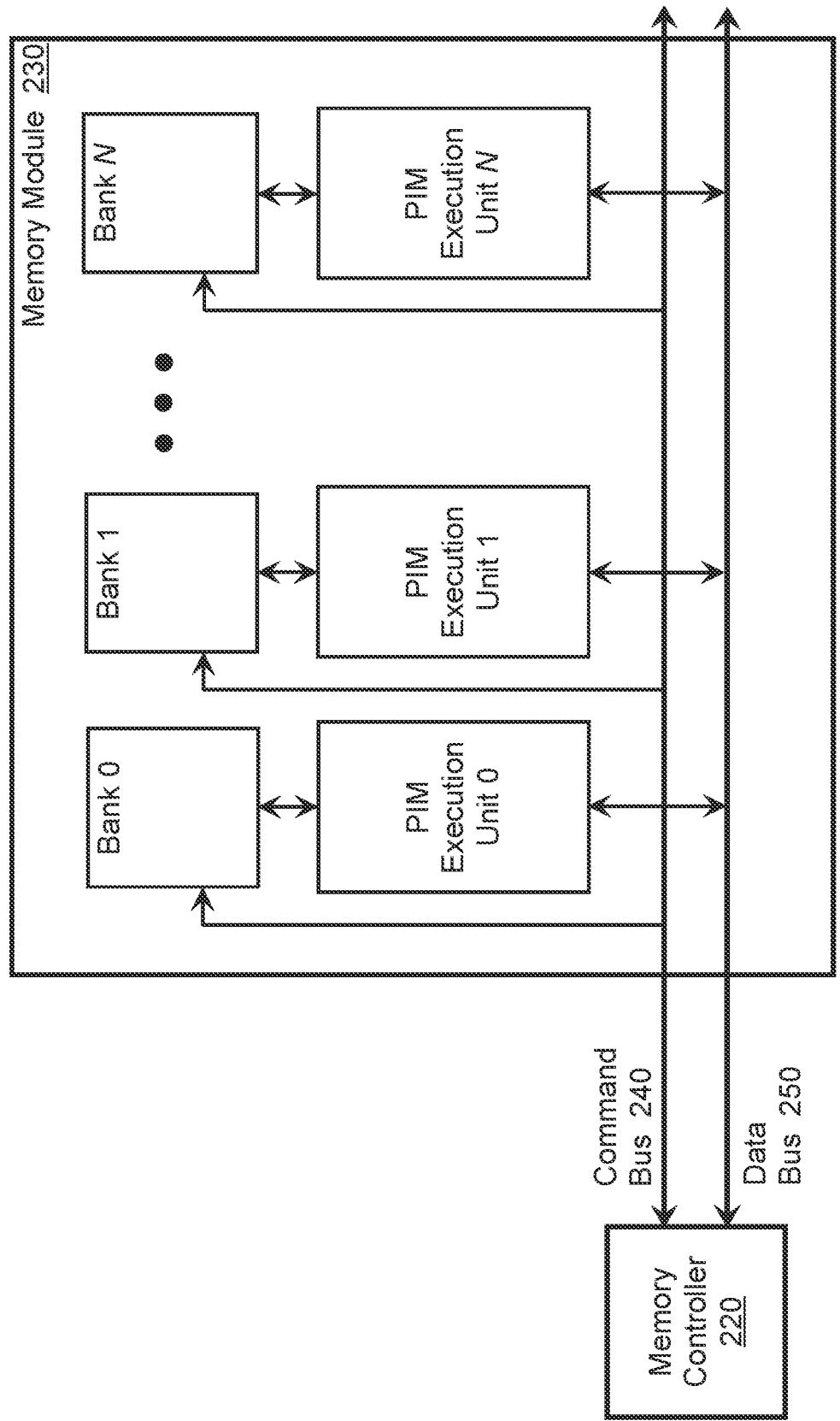
FIG. 2B depicts an example implementation of the memory module in the context of a PIM-enabled DRAM memory module.

FIG. 2B depicts an example implementation of the memory module 230 in the context of a PIM-enabled DRAM memory module communicatively coupled to the memory controller 220 via a command bus 240 and a data bus 250. The PIM-enabled DRAM memory module includes N number of banks, where each bank includes a corresponding PIM execution unit. The PIM execution units include processing logic and local storage in the form of registers for performing local computations. The memory module 230 includes fewer or additional elements that vary depending upon a particular implementation.

Figure 2C:
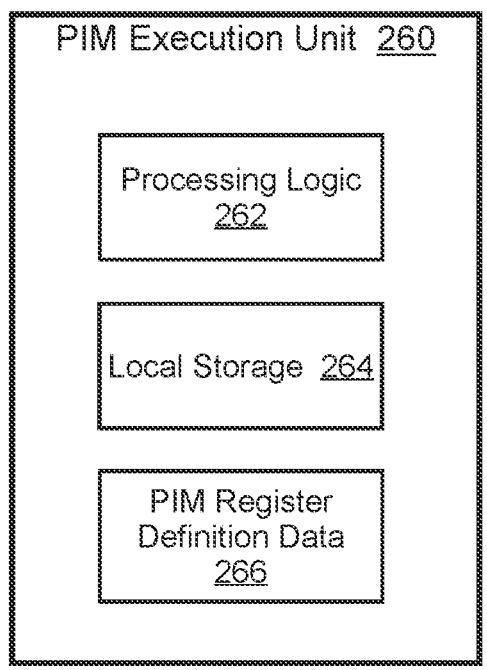
FIG. 2C is a block diagram that depicts an example implementation of a PIM execution unit.

FIG. 2C is a block diagram that depicts an example implementation of a PIM execution unit 260 that includes processing logic 262, local storage 264 and PIM register definition data 266. The PIM execution unit 260 incudes other elements and functionality that vary depending upon a particular implementation. Although the processing logic 262, the local storage 264 and the PIM register definition data 266 are depicted in FIG. 2C as separate, their respective functionality may be combined in any manner depending upon a particular implementation.

The processing logic 262 processes PIM commands using the PIM register definition data 266 and is implemented by computer hardware elements, computer software, or any combination of computer hardware elements and computer software. The local storage 264 is used by the processing logic 262 for performing computations and is implemented, for example, by one or more registers, although any type of local storage may be used. The PIM register definition data 266 generally specifies combinations of source and/or destination registers to be used to process PIM commands. As described in more detail hereinafter, in one implementation the PIM register definition data 266 defines pre-defined combinations of source and/or destination registers that are selectable for use with each PIM command. According to another implementation, the PIM register definition data 266 defines an initial combination of source and/or destination registers to be used with each PIM command and one or more update functions to update the combination of source and/or destination registers to be used to process subsequent invocations of each PIM command. The PIM register definition data 266 is stored, for example, in a command buffer in the PIM execution unit 260 and is configurable. Although implementations are depicted in the figures and described herein in the context of the PIM register definition data 266 being stored within the PIM execution unit 260, implementations are not limited to this example, and the PIM register definition data may be stored external to the PIM execution unit 260, within the memory module 230 or external to the memory module 230.

III. Processing PIM Commands Using PIM Register Definition Data

A. Introduction

FIG. 3 depicts two example PIM code segments that include similar computations with varied register operands. In these examples, the registers are local to the near-memory processing element that is processing the PIM commands, for example, in the local storage 264. The first pim-load command loads a value from memory at column-address0 into register reg0. The second pim-load command loads a value from memory at column-address1 into register reg2. The pim-multiply commands multiply the values in the first and second registers and store the result in the third register. For example, the first pim-multiply command multiplies the value in register reg0 and register reg0 and stores the result in register reg 1. Similarly, the pim-add (reg0, reg1, reg0) command adds the values stored in registers reg0 and reg1, and stores the result in register reg0.

B. Pre-Defined Combinations of PIM Registers

According to an implementation, the PIM register definition data 266 specifies multiple pre-defined combinations of source and/or destination registers. FIG. 4A depicts a table 400 of PIM register definition data 266 that specifies two pre-defined combinations of source/and or destination registers for each of the four PIM commands of FIG. 3, i.e., two pre-defined combinations for the pim-load, pim-multiply, pim-add, and pim-store commands. Each combination specifies a particular source and/or destination register for the corresponding PIM command. For example, the first command in the table 400 is a pim-load command for which the first combination (Combination 1) specifies that data from location X, where "X" represents, for example, a location in memory, is to be stored in register reg0. The second combination (Combination 2) of the pim-load command specifies that the data from location X is to be stored in register reg2. These two combinations of source and destination registers are the same as the two pim-load commands of FIG. 3.

As another example, the first combination (Combination 1) for the pim-add command specifies that the value stored in register reg 0 is added to the value stored in register reg 1, and then the sum is stored in register reg 0. The second combination for the pim-add command specifies that value stored in register reg 2 is added to the value stored in register reg 3, and the sum is stored in register reg 2. The particular register combinations depicted in FIG. 4A are for example purposes only and any number and type of register combinations may be used.

According to an implementation, the combination of source/and or destination registers to be used is specified by the PIM command. For example, PIM commands include an operand that specifies the combination of source/and or destination registers to be used for a particular PIM command. In the example depicted in FIG. 4A, an operand of zero corresponds to Combination 1 while an operand of one corresponds to Combination 2. Alternatively, the combination is specified by other information in the PIM command, such as low order bits of a DRAM column index in the PIM command. This provides fine-grained capability for software developers to specify a particular combination of source/and or destination registers to be used for each PIM command, for any number of iterations, without the source and/or destination register information having to be transmitted over the command bus 240. The PIM command specifies the particular command and the combination of source/and or destination registers using fewer bits than approaches that specify the source and destination registers in the PIM command According to another implementation, the current combination of source/and or destination registers is tracked and automatically incremented on each invocation of a PIM command. For example, the first time that a pim-load command is executed, the source and/or destination register combination specified by Combination 1 is used. The second time that the pim-load command is executed, the source and/or destination register combination specified by Combination 2 is used. This continues until the last combination of source/and or destination registers has been used and on the next invocation of the pim-load command, the current combination of source/and or destination registers "rolls over" to the first combination of source/and or destination registers and Combination 1 is used again. In this implementation, the processing logic 262 tracks the current combination of source/and or destination registers for each PIM command and advances it to the next combination upon each invocation of the corresponding PIM command. This implementation provides the additional technical benefit that PIM commands do even not need to specify the combination of source/and or destination registers to be used, which further reduces the amount of data required for a complete PIM command.

Although the example of FIG. 4A depicts two combinations of source/and or destination registers for each PTM command, implementations are not limited to only two combinations and the PIM register definition data 266 may specify any number of combinations of source/and or destination registers. In addition, the number of combinations of source/and or destination registers may be different for each PIM command. For example, one PTM command has two combinations of source/and or destination registers, as depicted in the table 400 of FIG. 4A, while another PIM command has N number of combinations of source/and or destination registers. This provides the capability and flexibility for software developers to configure the PIM register definition data 266 in a manner that is best suited for particular code regions.

Figure 5:
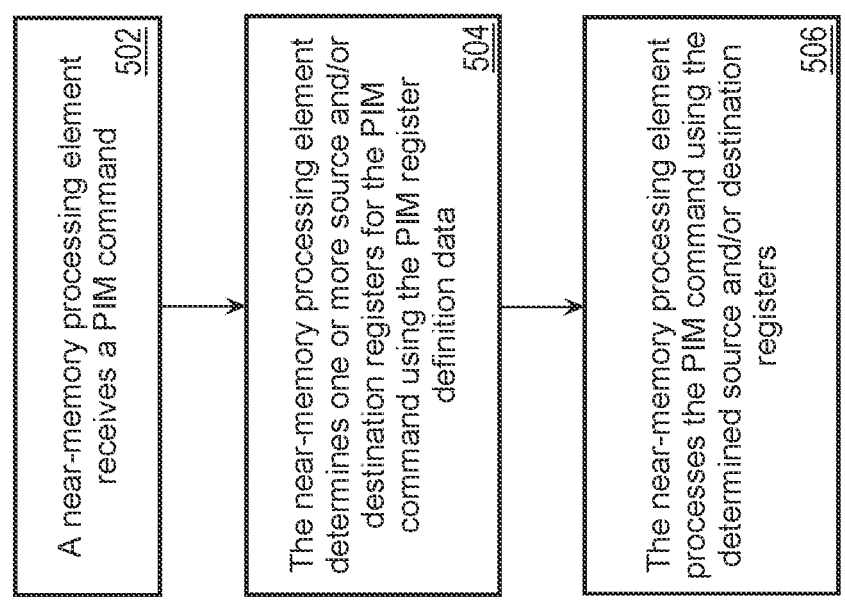
FIG. 5 is a flow diagram that depicts an approach for processing near-memory processing commands, e.g., PIM commands, using PIM register definition data that specifies pre-defined combinations of source and/or destination registers.

FIG. 5 is a flow diagram 500 that depicts an approach for processing near-memory processing commands, e.g., PTM commands, using PTM register definition data that specifies pre-defined combinations of source and/or destination registers. In step 502, a near-memory processing element receives a PIM command. For example, the PIM execution unit 260 receives a PIM command that specifies a command and a particular combination of source/and or destination registers to be used to process the PIM command, e.g., by an operand of the PIM command. Alternatively, the particular combination of source/and or destination registers is not specified by the PIM command and is instead determined by the near-memory processing element, as previously described herein.

In step 504, the near-memory processing element determines one or more source and/or destination registers for the PIM command using PIM register definition data. For example, the processing logic 262 in the PIM execution unit 260 uses the PIM register definition data 266 to determine the particular source and/or destination registers for the combination of source/and or destination registers specified by the PIM command or determined by the processing logic 262, e.g., based upon the current combination of source and/or destination registers.

In step 506, the near-memory processing element processes the PIM command using the determined source and/or destination registers. For example, the processing logic 262 processes the PTM command using the source and/or destination registers determined in step 504.

C. Dynamically-Determined Combinations of PIM Registers

According to an implementation, combinations of source/and or destination registers are dynamically determined using the PIM register definition data 266. This includes dynamically determining the source and/or destination registers for PIM commands using update functions.

FIG. 4B depicts a table 410 of PIM register definition data 266 that specifies, for each PIM command, a combination of source and/or destination registers and corresponding update functions. The initial values for the source and/or destination registers in the table 410 are used the first time that a PIM command is processed and then the update functions are used to update the source and/or destination register values for the next time that the PIM command is processed, and so on.

For example, the first time that a pim-load command is received for processing by the PIM execution unit 260, the processing logic 262 uses register reg0 as the destination for the value stored at location X. The processing logic 262 then uses the "Add 2" function in the "Destination Update Function" column to increment the destination register value by two for the next time that the pim-load command is processed. The processing logic 262 stores the updated destination value of register reg2 in the Destination column for the pim-load command in the table 410. Alternatively, the updated destination value is stored elsewhere, such as in the local storage 264. The source and destination register values for other PIM commands are not updated. In the example of the pim-load command, the Source 1 Update Function and the Source 2 Update Function are indicated in the table 410 as not applicable (n/a) since the source for a pim-load command is specified as an operand in the command.

Figure 6:
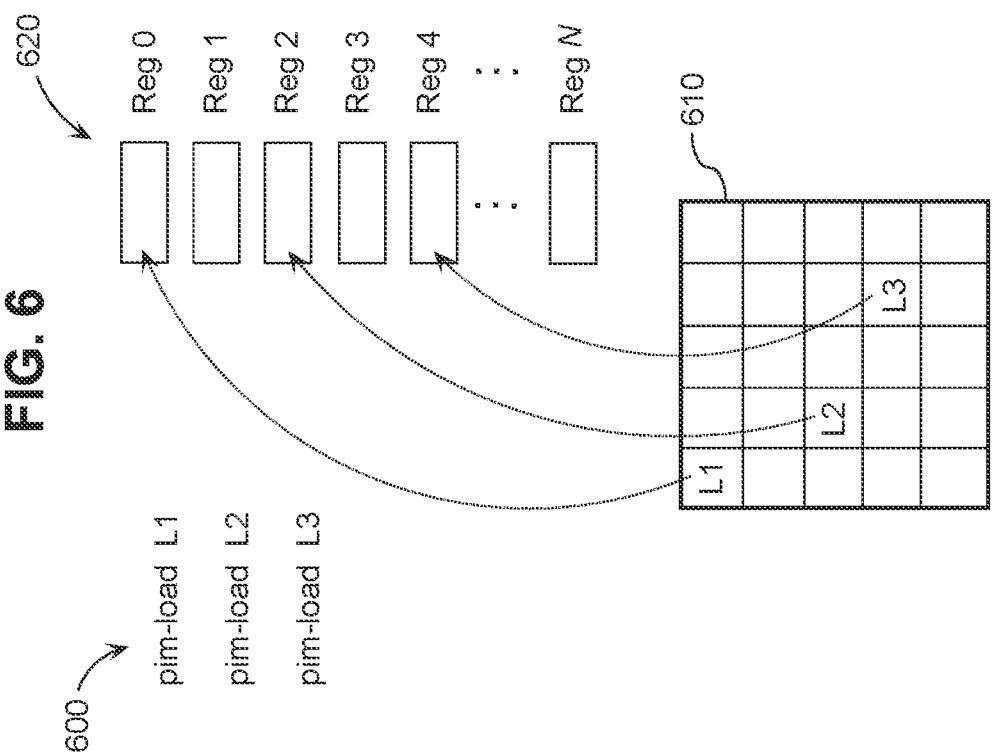
FIG. 6 depicts an example of dynamically updating the destination register for a pim-load command using PIM command definition data over three iterations.

FIG. 6 depicts an example of dynamically updating the destination register value for the pim-load command using the table 410 of PIM register definition data 266 over three iterations. A set of instructions 600 includes three pim-load commands with the respective sources of locations L1, L2, and L3 in a memory 610. The memory 610 is depicted as a two-dimensional array for purposes of explanation only and implementations are applicable to any type of memory arrangement. A set of registers 620 includes registers Reg0-RegN implemented, for example, in the local storage 264.

The first time the pim-load command is received by the PIM execution unit 260 for processing, the processing logic 262 determines the initial value for the destination register of register reg0 from table 410. The value from location L1 in the memory 610 is loaded into register reg0. The processing logic 262 then updates the destination register value using the Destination Update Function from table 410 and adds two to the destination register value, or register reg2.

The next time the pim-load command is processed by the processing logic 262, the value from location L2 in the memory 610 is stored in reg2 and the destination register value is again incremented by two to register reg4. The third time that the pim-load command is processed, the value from location L3 in the memory 610 is stored in register reg4. These three iterations of the pim-load command are accomplished without the pim-load command having to specify the destination register for the data, or a particular combination of source and/or destination registers using an operand as previously described herein, and is very useful, for example, for workloads where a large number of values are loaded from memory into registers and then one or more computations are performed on the values stored in the registers.

Continuing with another example from the table 410 of FIG. 4B, for the pim-add command, the current value in register reg0 is added to the value in register reg1 and the sum is stored in register reg0. The source and destination register values are each incremented by two so the next time a pim-add command is processed, the current value in register reg2 is added to the value in register reg3 and the sum is stored in register reg2, and so on. These examples illustrate another technical benefit of this approach, namely, that the PIM register definition data 266 can be implemented as a compact and efficient structure close to near-memory compute elements.

According to an implementation, when a change to a source or destination register value reaches the last or first register, by incrementing or decrementing, respectively, the next update causes the register value to roll over to the next available register to avoid invalid register values. For example, when the current register value is the last register, e.g., register reg9 in a 10 register implementation, and the update function specifies that the register value is to be incremented by one, the next register value rolls over to register reg0. Similarly, when the current register value is zero and the update function specifies that the register value is to be decremented by one, the next register value rolls over to register reg9.

Implementations are not limited to the example update functions depicted in FIG. 4B and source and destination register values may be decremented and incremented by different amounts. In some implementations, the update functions include various types of logic to update the source and destination registers values. For example, update logic specifies that register values are incremented until a specified register value is reached and then the register value is reset to the first register, or a specified register. As another example, update logic specifies that if the value stored in a particular register or memory location satisfies one or more criteria, then the register value is incremented or decremented by a specified amount, or updated to a specified value. Furthermore, update functions can include any arithmetic operation, such as addition, subtraction, multiplication, division, etc.

Although implementations are depicted in FIG. 4B in the context of the update functions being the same, i.e., Add 2, implementations are not limited to this example and in some implementations, different update functions are used for source and destination registers. Also, implementations are not limited to updating source and/or destination registers after a PIM command is processed and according to another implementation, the update functions are applied before a PIM command is processed. For example, the first time that the pim-load command is processed, the destination register value is incremented by two and register reg2 is used.

The data in tables 400, 410 is presented in the figures in table format for explanation purposes only and the data in tables 400, 410 is stored in any manner and/or format that may vary depending upon a particular implementation.

FIG. 7 is a flow diagram 700 that depicts an approach for processing PIM commands using PTM register definition data that specifies update functions for dynamically determining source and/or destination registers for PIM commands. In step 702, a near-memory processing element receives a PIM command. For example, the PIM execution unit 260 receives a PIM command that specifies a particular PIM command.

In step 704, the near-memory processing element determines one or more source and/or destination registers for the PIM command using PIM register definition data. For example, the processing logic 262 in the PIM execution unit 260 identifies the current source and/or destination register values specified in table 410.

In step 706, the near-memory processing element processes the PIM command using the determined source and/or destination registers. For example, the processing logic 262 processes the PTM command using the source and/or destination registers determined in step 704.

In step 708, the near-memory processing element uses the update functions to update the source and/or destination register values for the next time that the PIM command is processed. In the present example, the processing logic 262 applies the update function(s) to determine new source and/or destination register values to be used the next time that the PIM command is processed. As previously described herein, in some implementations the update functions are applied before a PIM command is processed.

IV. Alternatives and Software Support

The use of pre-defined combinations of source and/or destination registers and dynamically determining combinations of source and/or destination registers described herein are not mutually exclusive and are combinable. For example, according to an implementation, the PIM register definition data 266 includes both predefined combinations of source and destination registers for some PIM commands, and dynamically determined combinations using update functions for other PIM commands. This provides great flexibility for software developers to optimize the use of these solutions for particular implementations.

According to an implementation, software support is provided for configuring and updating the PIM register definition data 266. For example, in some implementations the software support includes the capability to configure and update the data contained in the tables 400, 410. In other implementations, the software support includes, for the pre-defined combinations implementation of FIG. 4A, the capability to explicitly specify the current combination of source/and or destination registers, increment or decrement the current combination, or otherwise manipulate the current combination of source/and or destination registers for each PIM command. One example is the ability to specify a function, such that if one or more of the address bits are odd, the first combination of source and/or destination registers is used, if the one or more address bits are even, the second combination of source and/or destination registers is used, or vice versa, etc. In other implementations, the software support includes, for the dynamically-determined combinations implementation of FIG. 4B, the capability to explicitly specify the current combination of source/and or destination registers for each PIM command and the update functions used to update the source and destination registers. As in the prior example, the update functions may be contingent upon address bits specified by a PIM command.

The invention claimed is:

1. An execution unit configured to process a command that contains a number that identifies a particular combination of multiple registers selected from a plurality of combinations of multiple registers, wherein:
   the command does not contain an identifier of a register, and
   the command is a near-memory processing command or a processing-in-memory (PIM) command.

2. The execution unit of claim 1, further configured to process the command a second time using a different combination of multiple registers from the plurality of combinations of multiple registers.

3. The execution unit of claim 1, wherein:
   the execution unit is a PIM execution unit;
   data that specifies the plurality of combinations of multiple registers is stored local to the PIM execution unit.

4. The execution unit of claim 1, wherein the particular combination of multiple registers comprises a first register that is read by the command and a second register that is written by the command.

5. The execution unit of claim 1, wherein the plurality of combinations of multiple registers is designated for the command.

6. The execution unit of claim 1, wherein the execution unit is in a memory bank or a volatile memory module.

7. An execution unit configured to:
   process a command that contains number that identifies a particular combination of multiple registers, wherein the command does not contain an identifier of a register; and
   update the particular combination of multiple registers to specify a different register.

8. The execution unit of claim 7, further configured to use one or more update functions to update the particular combination of multiple registers to specify a different register.

9. The execution unit of claim 8, wherein the one or more update functions specify one or more of an increment amount or a decrement amount.

10. The execution unit of claim 8, wherein the particular combination of multiple registers and the one or more update functions are specific to the command.

11. The execution unit of claim 8, further configured to update the one or more update functions.

12. The execution unit of claim 7, wherein:
the execution unit is a PIM execution unit;
data that specifies the particular combination of multiple registers is stored local to the PIM execution unit.

13. The execution unit of claim 7, wherein the particular combination of multiple registers comprises a first register that is read by the command and a second register that is written by the command.

14. The execution unit of claim 7, wherein:
the execution unit is a PIM execution unit;
data is stored local to the PIM execution unit that specifies, for each individual command of a plurality of commands, both a respective combination of multiple registers to be used to process the individual command, and one or more update functions for updating the respective combination of multiple registers.

15. The execution unit of claim 7, wherein the execution unit is in a memory bank or a volatile memory module.

16. A processor configured to issue a command that contains number that identifies a particular combination of multiple registers, wherein:
the command does not contain an identifier of a register, and
the command causes a near-memory processing element to perform one or more computations using the particular combination of multiple registers.

17. The processor of claim 16, further configured to send to the near-memory processing element, data that specifies one or more combinations of multiple registers, or one or more update functions to update one or more registers for the particular combination of multiple registers.

18. The processor of claim 17, wherein the one or more update functions specify one or more of an increment amount or a decrement amount.

* * * * *